Feb. 25, 1958 W. B. RICE, JR 2,824,625
ONE-WAY BRAKE FOR VERTICAL MOTORS
Filed Aug. 9, 1954
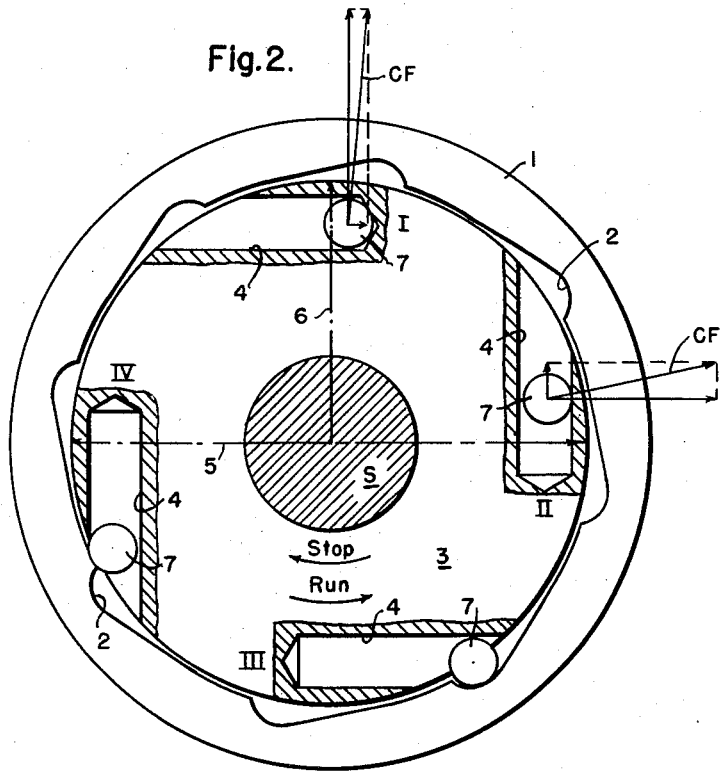
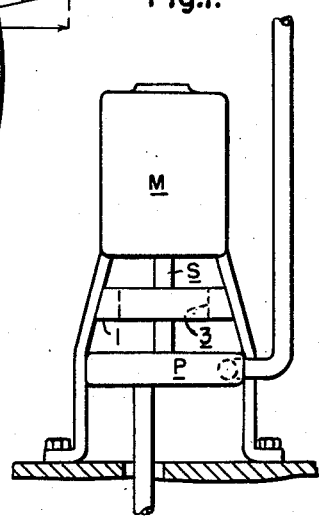
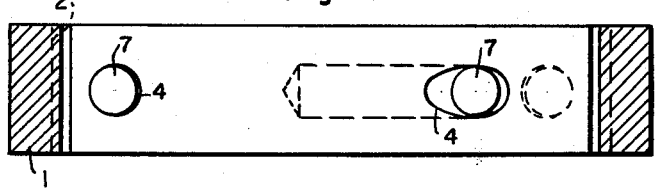
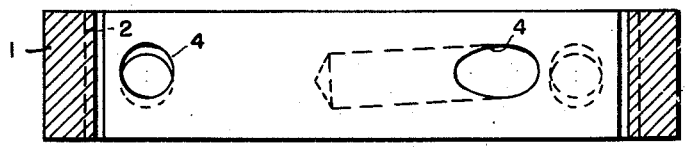
WITNESSES:
E. A. McCloskey.
Wm. B. Sellers.
INVENTOR
Willard B. Rice, Jr.
BY
Paul E. Friedemann
ATTORNEY

United States Patent Office 2,824,625
Patented Feb. 25, 1958

2,824,625

ONE-WAY BRAKE FOR VERTICAL MOTORS

Willard B. Rice, Jr., Los Gatos, Calif., assignor to Westinghouse Electric Corporation, East Pittsburgh, Pa., a corporation of Pennsylvania Application August 9, 1954, Serial No. 448,516

6 Claims. (Cl. 188—82.84)

My invention relates to protecting devices for electric motors and more particularly to one-way brake means to prevent reverse operation of the motor by the load when the motor is not energized.

One-way brakes are used with vertical pump motors, driving centrifugal pumps or similar load units, to prevent reverse rotation of the pump by the water or other liquid running through the pump backwardly when the pump motor is deenergized to stop the pump.

Such reverse direction of rotation very likely would unscrew the pump shafting, and further, as the water returns into the well from a considerable head of the water in the piping excessive back-spin speeds are produced.

To prevent such back-spin, ratchets have been used for this application. The trouble with the ratchets used heretofore was that there was too much time lag in the ratchet operation so that the rotating parts attained considerable reverse speed before the ratchet engaged. The rotating parts were thus subjected to shock and impact action. When the holding ratchet or brake means were not of the jaw type there was slippage and thus no positive action.

One object of my invention is the provision of one-way brake means having positive locking action with a very minimum of time lag, to thus prevent mechanical shock on the driving motor and the movable load elements coupled to the motor.

One broad object of my invention is the provision of positively and rapidly acting locking means of a rotating shaft to the stationary parts of a machine immediately upon initiation of reverse operation of a shaft.

The objects stated are merely illustrative. Other objects and advantages will become more apparent from a study of the following specification and the accompanying drawing, in which:

Figure 1 is a somewhat schematic showing of my invention as applied in use;

Fig. 2 is a somewhat schematic showing of a plan view of my invention with parts broken away to facilitate the disclosure;

Fig. 3 is an edge view of the subject matter shown in Fig. 1, with certain parts shown in section; and Fig. 4 is a showing of a modification of my invention with the view being similar to Fig. 3.

In the drawing, 1 designates the stationary element of the one-way brake constituting my invention. The stationary element is part of the frame structure carrying the bearings for the shaft S. The element may be an iron casting or be made of structural steel or similar metal. This element 1 has an internal cylindrical surface provided with at least one, but preferably a plurality, of pockets 2 shaped as shown.

From the showing it is apparent that the pocket has a cylindrical surface generated by a line parallel to the shaft axis, and at the leading end—considering the clockwise direction as leading—terminates into a right cylindrical surface having a selected radius.

A relatively flat right cylindrical member, or hub, 3, is rigidly secured to shaft S so as to rotate with the shaft. This hub 3 fits into element 1 with a relatively small clearance as shown.

The hub 3 is provided with at least one hole, as the hole 4, drilled as shown into the outer cylindrical surface with the axis of hole 4 parallel to a first radius 5 of the hub 3 and of sufficient depth so as to extend a selected distance beyond a second radius 6 perpendicular to the first radius 5.

The hub 3 is preferably provided with a plurality of circumferentially equally spaced holes drilled as above specified. The equal spacing of the holes provides for a balanced distribution of the weight of the hub. Ordinarily two holes at 180° spacing will suffice. In order to reduce the time lag of the engagement of the one-way brake to a very minimum, the element 1 should preferably be provided with as many equally spaced pockets, like the pocket 2, as the internal cylindrical surface of element 1 will accommodate.

A tough steel, or other metal, ball 7 is disposed in the hole 4. The diameter of the ball is a trifle less than the diameter of the hole 4, so as to freely roll within the hole. The right cylindrical leading end of the pocket is selected to have a radius a trifle larger than the radius of the ball.

The depth of the hole 4 is so chosen that it extends beyond radius 6 for a distance substantially equal to the diameter of the ball 7.

If during normal pumping operation the shaft S, as shown in Fig. 2, is considered as rotating in a counterclockwise direction then the centrifugal force acting on the ball 7 will have a component along the axis of the hole toward the bottom of the hole. The ball 7 thus remains in the position shown at station I.

When the motor M is deenergized and hub 3 begins to accelerate in a clockwise direction then the inertia of the ball 4 causes it to roll out of the hole. The instant the center of the ball moves above the radius shown at station II the centrifugal force has a component along the hole axis away from the bottom of the hole. The ball is thus driven out of the hole. An instant later it will lodge in the pocket as shown at station III to thus lock the shaft S to element 1. It should be noted that the ball is subjected only to a compressive force and is not subject to shear.

The locking action on the shaft will continue as long as there is a clockwise torque on the shaft. This usually continues until the water in the piping above the pump P has returned to the well.

When the pump P is to be started the motor M drives the shaft S in the counterclockwise direction. The acceleration of hub 3 is now in the counterclockwise direction. The ball 7 is thus scooped out of the pocket 2 by the sides of the hole 4, as shown at station IV, and lodges in the position shown at station I.

Ordinarily the structure hereinbefore discussed provides for very satisfactory operation. When the head of water above the pump P has leaked past the turbine pump blades back into the well so that there no longer is a clockwise torque on shaft S, then the need for the position of ball 7 in the leading end of the pocket no longer exists. The ball 7 could automatically return to the bottom of the hole. This may be accomplished by drilling the hole 4 so that its bottom is a trifle below the median transverse horizontal plane of hub 3 and its open end is a trifle above this plane. This is shown in Fig. 4.

While I have shown and described but one embodiment and one modification of my invention, it is understood that my invention is capable of various adaptations and that changes and modifications may be made that fall within the spirit of my invention.

I claim as my invention:

1. A one-way brake mechanism for preventing the reverse rotation of a shaft normally disposed in a vertical position, in combination, a stationary member having a vertically disposed generally right circular cylindrical internal surface, said surface being provided with a plurality of pockets which at their leading ends, considering the leading direction to be clockwise when viewed in plan, terminate in sectors of right circular cylinders having a selected diameter and forming the bottoms of the pockets, a shaft disposed coaxially of the said surface, a hub rigidly secured to the shaft, said hub being in the shape of a relatively flat right circular cylinder fitting with a small clearance into said surface of said stationary member, said hub being provided with a well, open at the peripheral cylindrical surface, and having an axis that is parallel to a first radius and perpendicular to a second radius of the hub, and having a depth in the leading direction sufficient to extend beyond said second radius a distance substantially equal to said selected diameter, and a ball in the well having a diameter a trifle less than said selected diameter.

2. A one-way brake mechanism for preventing the reverse rotation of a vertically disposed shaft, in combination, a horizontally disposed stationary member having a cylindrical internal surface having a vertical axis, said surface being provided with a plurality of pockets which at their leading ends, considering the leading direction to be clockwise when viewed in plan, terminate in sectors of right cylinders having a selected diameter and forming the bottoms of the pockets, a vertical shaft disposed coaxially with the cylindrical surface, a cylindrical hub rigidly secured to the shaft, said hub having a diameter a trifle less than the internal diameter of said internal surface and being secured to the shaft to fit into said stationary member, and said hub being provided with a well, open at the peripheral cylindrical surface, and having an axis that is parallel to a first diameter and perpendicular to a second diameter of the hub, and having a depth in the leading direction sufficient to extend beyond said second diameter of the hub a distance substantially equal to said selected diameter, and a ball in the well having a diameter a trifle less than said selected diameter.

3. A one-way brake mechanism for preventing the reverse rotation of a vertically disposed shaft, in combination, a horizontally disposed stationary member having a cylindrical internal surface having a vertical axis, said surface being provided with a plurality of pockets which at their leading ends, considering the leading direction to be clockwise when viewed in plan, terminate in sectors of right cylinders having a selected diameter and forming the bottoms of the pockets, a vertical shaft disposed coaxially with the cylindrical surface, a cylindrical hub rigidly secured to the shaft, said hub having a diameter a trifle less than said internal surface and being secured to the shaft to fit into said stationary member and said hub being provided with a pair of equally spaced wells, open at their peripheral cylindrical surfaces and each having an axis that is parallel to a first diameter and perpendicular to a second diameter of the hub and having depths in the leading direction sufficient to extend beyond said second diameters of the hub a distance substantially equal to said selected diameter, and a ball in each well having a diameter a trifle less than said selected diameter.

4. A one-way brake mechanism for preventing the reverse rotation of a vertically disposed shaft, in combination, a shaft disposed in suitable bearings to rotate on a vertical axis, an annular hub rigidly and coaxially secured to the shaft, an annular stationary member surrounding the hub, a pocket in the annular stationary member having a shallow sloping opening at its trailing end and terminating into a bottom at its leading end, considering the leading direction to be clockwise when viewing the member in plan, a well in the hub having an axis normal to a radius of the hub, and a ball in the well, the annular disposition of the axis of the well with respect to a plane normal to the shaft axis and its depth with respect to a hub radius being such that the ball normally is held at the bottom of the well by centrifugal force during normal non-accelerated rotation of the shaft but rolls out of the well to lodge in the pocket when the hub is accelerated in the leading direction.

5. A one-way brake mechanism for preventing the reverse rotation of a vertically disposed shaft, in combination, a shaft disposed in suitable bearings to rotate on a vertical axis, an annular hub rigidly and coaxially secured to the shaft, an annular stationary member surrounding the hub, a pocket in the member having a shallow sloping opening at its trailing end and terminating into a bottom at its leading end, considering the leading direction to be clockwise when viewing the member in plan, a well in the hub having its axis normal to a diameter of the hub and with the bottom being in the leading direction and the bottom extending beyond said diameter, and a ball in the well, said ball normally being at the bottom of the well but rolls out to lodge in the bottom of the pocket when the hub is accelerated in the leading direction.

6. A one-way brake mechanism for preventing the reverse rotation of a vertically disposed shaft, in combination, a shaft disposed in suitable bearings to rotate on a vertical axis, an annular hub rigidly and coaxially secured to the shaft, an annular stationary member surrounding the hub, a pocket in the member having a shallow sloping at its trailing end and terminating into a bottom at its leading end, considering the leading direction to be clockwise when viewing the member in plan, a well in the hub having its axis normal to a diameter of the hub and with the bottom being in the leading direction, the bottom being slightly lower than the opening, and the bottom extending beyond said diameter, and a ball in the well, said ball normally being at the bottom of the well but rolls out to lodge in the bottom of the pocket when the hub is accelerated in the leading direction.

References Cited in the file of this patent

UNITED STATES PATENTS 156,835  Wyman  Nov. 10, 1874